G. D. POGUE.
RECORDING APPARATUS.
APPLICATION FILED NOV. 7, 1917.
1,300,191.
Patented Apr. 8, 1919.
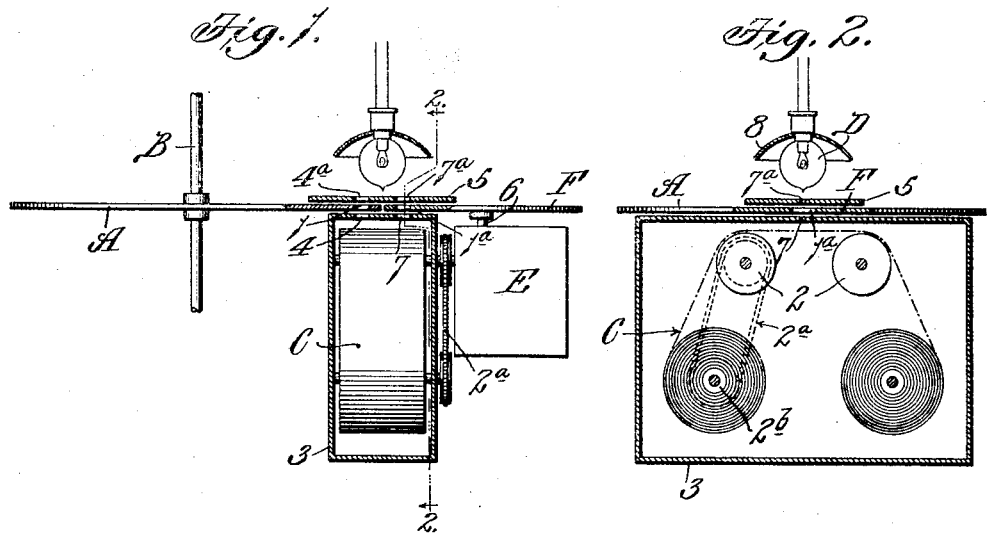
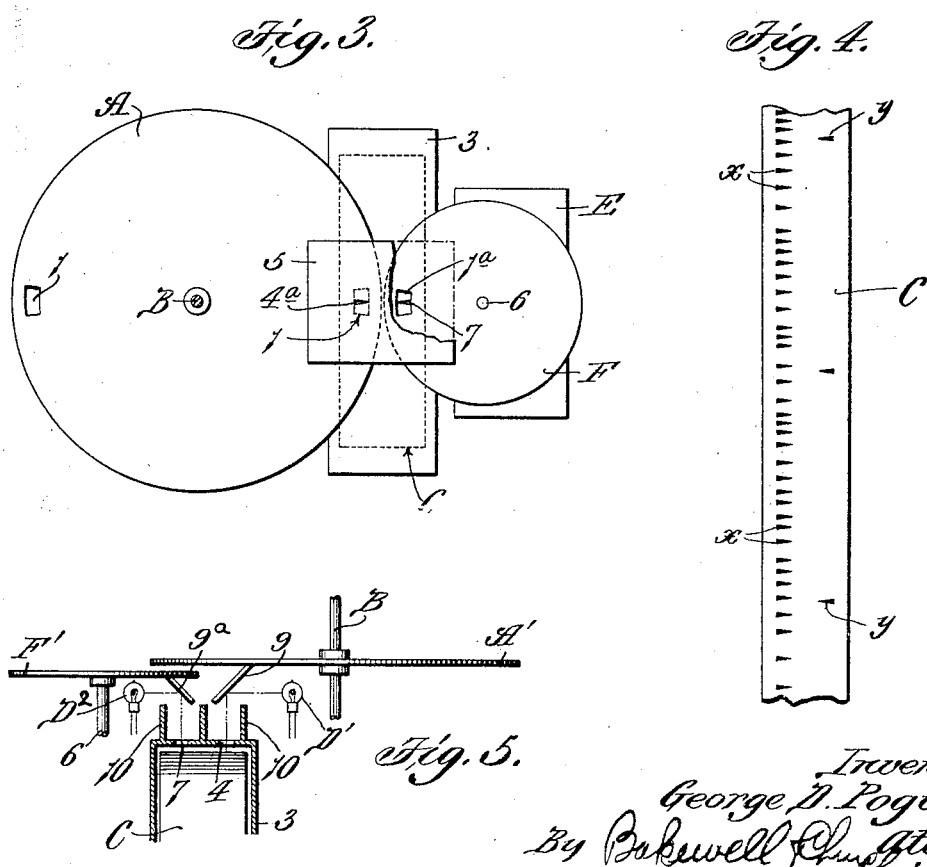
Inventor,
George D. Pogue.
By Bakewell  Attys.

UNITED STATES PATENT OFFICE.

GEORGE D. POGUE, OF ST. LOUIS, MISSOURI.

RECORDING APPARATUS.

1,300,191. Specification of Letters Patent. Patented Apr. 8, 1919.

Application filed November 7, 1917. Serial No. 200,719.

*To all whom it may concern:*

Be it known that I, GEORGE D. POGUE, a citizen of the United States, residing at St. Louis, Missouri, have invented a certain new and useful Improvement in Recording Apparatus, of which the following is a full, clear, and exact description, such as will enable others skilled in the art to which it appertains to make and use the same.

One type of apparatus that is now in general use for making a record of the movements of a watt-hour meter for the purpose of determining the maximum average demand made by a consumer during an interval of prescribed length, such, for example, as a fifteen minute interval or a thirty minute interval, comprises a contact making device operated by the meter and arranged in an electric circuit that is equipped with a magnet or solenoid and a stylus or marking device which prints or marks an impression on a clock-driven tape each time the magnet or solenoid is energized. An apparatus of the type referred to has two serious objectionable features, namely, the contact making device imposes an additional load on the moving element of the meter which impairs the accuracy of the meter, and the contacts of said contact making device are liable to corrode or weld together, either one of which features may result in complete failure of the apparatus.

The main object of my invention is to provide a means of novel form for recording the movements of a watt-hour meter or other delicate mechanism without imposing any frictional load on the meter or without the necessity of using a contact making device operated by the moving element of the meter, which means is so constructed that it will produce a record of novel form.

Another object is to provide a non-frictional means for making a record of the movements of a watt-hour meter or other delicate mechanism consisting of a tape or record strip provided with marks that represent time blocks or clock intervals of equal duration, and also provided with a series of marks, each of which represents a certain value or a certain quantity.

And still another object is to provide a recording apparatus of the kind above referred to in which the record is made by permitting or causing a ray of light to act on a record strip that is sensitive to light, one or more times during each cycle of operations of the meter or mechanism with which the apparatus is used, and form a row of marks on said strip that extends in a straight line longitudinally of the strip.

To this end I have devised a recording apparatus comprising a record strip that is sensitive to light and which is preferably in the form of a ribbon or tape that is driven at a uniform speed or rate per hour, a source of light and a governing member operated by the meter or mechanism with which the apparatus is used for causing or permitting rays of light from said source of light to act on said record strip intermittently when the meter is in operation, and thus produce marks on said record strip, each of which marks represents a certain value or a certain quantity, depending upon the character of the mechanism with which the apparatus is used. If desired the apparatus may comprise means for expressing intervals on the record strip, but the apparatus herein shown being so constructed that it forms marks on the record strip progressively when the apparatus is in operation by causing or permitting a ray of light to act on the record strip at fixed intervals of equal duration, which marks I will hereinafter refer to as "time marks."

Figure 1 of the drawings is a vertical sectional view of a recording apparatus constructed in accordance with my invention.

Fig. 2 is a vertical sectional view, taken on the line 2—2 of Fig. 1.

Fig. 3 is a top plan view of the apparatus shown in Fig. 1.

Fig. 4 is a top plan view of a portion of the record strip; and

Fig. 5 is a vertical sectional view, illustrating a slight modification of my invention.

Referring to Figs. 1 to 3 of the drawings, which illustrate the preferred form of my invention, A designates the governing member of the apparatus, which is preferably mounted on the shaft or moving element B of the watt-hour meter or mechanism with which the apparatus is used. C designates the record, preferably a tape or strip that is sensitive to light, and D designates a lighting unit or source of light. Said lighting unit is arranged in proximity to the record strip C, and the governing member A, which preferably consists of a disk-shaped member provided with one or more holes 1, is so arranged that it revolves in a horizontal plane between the lighting unit D and the record strip C. The record strip C is arranged inside of a light proof housing 3 in such a manner that a portion of said strip travels over guide rollers 2 from a supply roll onto a winding roll, as shown in Fig. 2, and the top wall of the housing 3 is provided with a hole 4 through which the light from the lighting unit D passes and acts on the record strip C, so as to form a mark $x$ thereon whenever one of the holes 1 in the governing member A comes into alinement with said hole 4. Accordingly, when the apparatus is in operation a mark $x$ will be formed on the record strip each time current of a certain value flows through the meter, said marks $x$ extending in a straight line longitudinally of the record strip and thus producing a record which is clearer and more accurate than the records produced by the curve drawing recording apparatus now in general use. The tape or strip C is driven at a uniform speed by any suitable means, such, for example, as a clockwork mechanism E, and a slip belt $2^a$ passes around a pulley $2^b$ on the shaft of the roll onto which the record strip C is wound. In order that the marks $x$ made on the record strip will be clear cut or sharply defined, I prefer to arrange a shield 5 between the source of light D and the governing member A and provide said shield with a hole $4^a$ in exact vertical alinement with the hole 4 in the top wall of the housing 3, the holes 4 and $4^a$ being of the same shape and dimensions and considerably smaller than the holes 1 in the governing member A.

When the apparatus is used in connection with a watt-hour meter for making a record of the movements of the meter, it is desirable that the record strip C be provided with means that represent time blocks or clock intervals of fixed duration, such, for example, as fifteen minute periods or thirty minute periods, so that said record strip will show the maximum average demand made by the consumer during an interval of specified length. Various means may be used for this purpose, but I prefer to construct the apparatus in such a manner that when it is in operation marks $y$ will be formed on the record strip C successively, each of which marks $y$ represent the completion of a certain fixed interval of time. In the apparatus shown in Figs. 1 to 3 a rotatable member F of substantially disk form is mounted on the shaft 6 of the clockwork mechanism E in such a manner that said member F will permit a ray of light from the source of light D to act on the record strip at certain intervals, and thus form time marks $y$ thereon. The member F is arranged to travel between the shield 5 and the top wall of the housing 3 that incases the record strip, and said member F is provided with a hole $1^a$ that comes into alinement with two vertically alined holes 7 and $7^a$ in the top wall of the housing 3 and in the shield 5, respectively, at the end of each demand interval, thus permitting the light from the lighting unit D to act on the record strip. The holes 7 and $7^a$ are of the same shape and dimensions and are considerably smaller than the hole $1^a$ in the member F, so that the marks $y$ produced by the action of the light on the record strip will be clear cut or sharply defined. A reflector 8 is preferably arranged above the lighting unit D, so as to project the light downwardly through the holes in the shield 5.

While I prefer to use a governing member provided with one or more holes through which rays of light pass and act on the record strip, I wish it to be understood that my invention is not limited to an apparatus of the particular construction illustrated in Figs. 1 to 3, as my broad idea consists of a means governed by the meter or mechanism with which the apparatus is used for permitting or causing a ray of light to act on a sensitized record or a record that is sensitive to light when the meter is in operation, and thus produce marks on the record, each of which marks represents a definite value or quantity. Therefore, in Fig. 5 of the drawings I have illustrated another form of my invention, wherein the action of the light rays on the record strip is produced by a governing member provided with a reflector and arranged in such a manner that when said governing member is in operation rays of light will strike said reflector intermittently and be projected by same onto the record strip. In the apparatus shown in Fig. 5 the record strip and the housing for said strip are substantially the same as those used in the apparatus shown in Figs. 1 to 3. The governing member A', however, consists of an imperforate disk provided on its underside with a reflector 9 preferably arranged in an inclined position and so disposed that when it comes into vertical alinement with the hole 4 in the top wall of the housing 3 a ray of light from a lighting unit D' will strike said reflector and be projected by same through the hole 4 in the top wall of the record housing, as indicated by the broken lines in Fig. 5. A similar means is provided for producing the time marks $y$ on the record strip, said means consisting of a member F' operated by the shaft 6 of the clockwork mechanism that drives the record strip and provided on its underside with an inclined reflector $9^a$ arranged so that when it passes over the hole 7 in the top wall of the record housing a ray of light from a lighting unit $D^2$ will strike said reflector and be projected by same through said hole onto the record strip. If desired, the top wall of the record housing can be provided with a vertically-disposed shield 10, shown in Fig. 5, so as to prevent the light from the lighting unit D' entering the hole 7 in the housing and the light from the lighting unit D² entering the hole 4 in the top wall of the record housing.

Having thus described my invention, what I claim, and desire to secure by Letters Patent, is:

1. A recording apparatus adapted to be used with a watt-hour meter or other mechanism, comprising a record strip that is sensitive to light, and means whereby a ray of light will act on said record strip intermittently when said mechanism is in operation and produce a series of spaced marks that extend in a straight line longitudinally of the record strip, each of which marks represents a certain value or a certain quantity.

2. A recording apparatus adapted to be used with a watt-hour meter or other mechanism, comprising a record that is sensitive to light, means for moving said record at a fixed speed or rate per hour, and means whereby a ray of light will act on said record each time current of a certain value flows through the meter and thus produce marks on said record, the total number of which, within a certain length of the record, represent the value or quantity of current passing through the meter during a certain period.

3. A recording apparatus adapted to be used with a watt-hour meter or other mechanism, comprising a record strip that is sensitive to light, means for moving said record strip at a fixed speed or rate per hour, means whereby a ray of light will act on said record strip intermittently when the mechanism is in operation and thus produce a series of marks that extend in a straight line longitudinally of the strip, and means for producing marks on said record strip so as to represent time blocks or intervals of time.

4. A recording apparatus for watt-hour meters, comprising a movable record that is sensitive to light and which travels at a fixed speed, or rate, per hour, and means operated by or governed by the meter with which the apparatus is used for causing or permitting a ray of light to act on said record intermittently each time current of a certain quantity or value passes through the meter and produce a series of spaced marks on said record that extend in a line longitudinally of the path of travel of the record.

5. A recording apparatus for watt-hour meters, comprising a source of light, a movable record that travels at a fixed speed or rate per hour, irrespective of the speed of operation of the meter with which the apparatus is used, a watt-hour meter, and a movable means governed by said meter and having a fixed path of travel for causing a ray of light from said source to act on said record intermittently each time current of a certain value or quantity passes through the meter and form marks on said record which constitute a record of the operations of the meter.

6. The combination of a watt-hour meter, a source of light, a movable record that is sensitive to light and which travels at a fixed speed or rate per hour, and a rotatable governing member operated by the meter and having no direct connection with said record for causing or permitting a ray of light to act on said record intermittently and produce marks thereon that constitute a record of the movements of said meter.

7. A recording apparatus for watt-hour meters and the like, comprising a source of light, a record that is sensitive to light, a rotatable member operated by the meter with which the apparatus is used, and means on said member for causing a ray of light from said source to act on said record one or more times during each cycle of operations of the meter and thus produce a series of marks on said record which constitute a record of the movements of said meter.

8. A recording apparatus adapted to be used with a watt-hour meter or other mechanism, comprising a record that is sensitive to light, means for causing said record to move at a fixed speed or rate per hour, a source of light, means for causing a ray of light from said source to act on said record intermittently so as to produce a record of the movements of said mechanism, and means for forming time marks on said record at fixed intervals.

9. The combination of a watt-hour meter, a source of light, a record strip that is sensitive to light, a light-proof housing for said record strip provided with an opening, and a rotatable means operated by said meter for causing a ray of light from said source to pass through said opening and act on said record strip when the meter is in operation so as to produce a record of the movements of said meter.

10. The combination of a watt-hour meter, a source of light, a record strip that is sensitive to light, a light-proof housing for said record strip provided wtih an opening, means controlled by said meter for causing a ray of light from said source to pass through said opening and act on said record strip when the meter is in operation so as to produce a record of the movements of said meter, and means for producing time marks on said record strip successively at predetermined intervals.

11. A recording apparatus, comprising a source of light, a record strip that is sensitive to light, a light-proof housing for said record strip provided with an opening, a watt-hour meter, means operated by said meter for causing a ray of light from said source to pass through said opening and act on said record strip when the meter is in operation so as to produce a record of the movements of said meter, a driving means for causing said record strip to travel at a fixed speed or rate per hour, and means operated by said driving means for causing a ray of light to act on said record strip at stated intervals and produce marks thereon which represent time blocks or fixed intervals of time.

12. A recording apparatus, comprising a source of light, a record strip that is sensitive to light, a light-proof housing for said record strip provided with an opening, a watt-hour meter and a governing member operated by said meter that normally prevents the rays of light from said source from entering the opening in said housing, said governing member having a definite path of travel and being provided with a hole or perforation arranged in such a manner that it will come into alinement with the opening in said housing and thus permit a ray of light to act on said record strip intermittently, thereby producing a record of the movements of said meter.

13. A recording apparatus, comprising a source of light, a record strip that is sensitive to light, a light-proof housing for said record strip provided with two openings, a driving means for causing said record strip to travel at a fixed speed, a rotatable governing member operated by the mechanism with which the apparatus is used and provided with a hole that comes into alinement with one of the openings in said housing when said mechanism is in operation, and an independent member operated by the record strip driving means and provided with a hole that comes into alinement with the other opening in said housing at stated intervals.

14. A recording apparatus, comprising a record strip that is sensitive to light, a light-proof housing for said strip provided with two openings, two independent sources of light, a driving means for causing said record strip to travel at a fixed speed or rate per hour, and two independent members, one operated by the mechanism with which the apparatus is used and the other by said driving means and each provided with a reflector arranged in such a manner that at certain periods in the cycles of operation of said members rays of light will be projected through the openings in said housing onto said record strip.

GEORGE D. POGUE.

Copies of this patent may be obtained for five cents each, by addressing the "Commissioner of Patents, Washington, D. C."